Figures 1, 2:
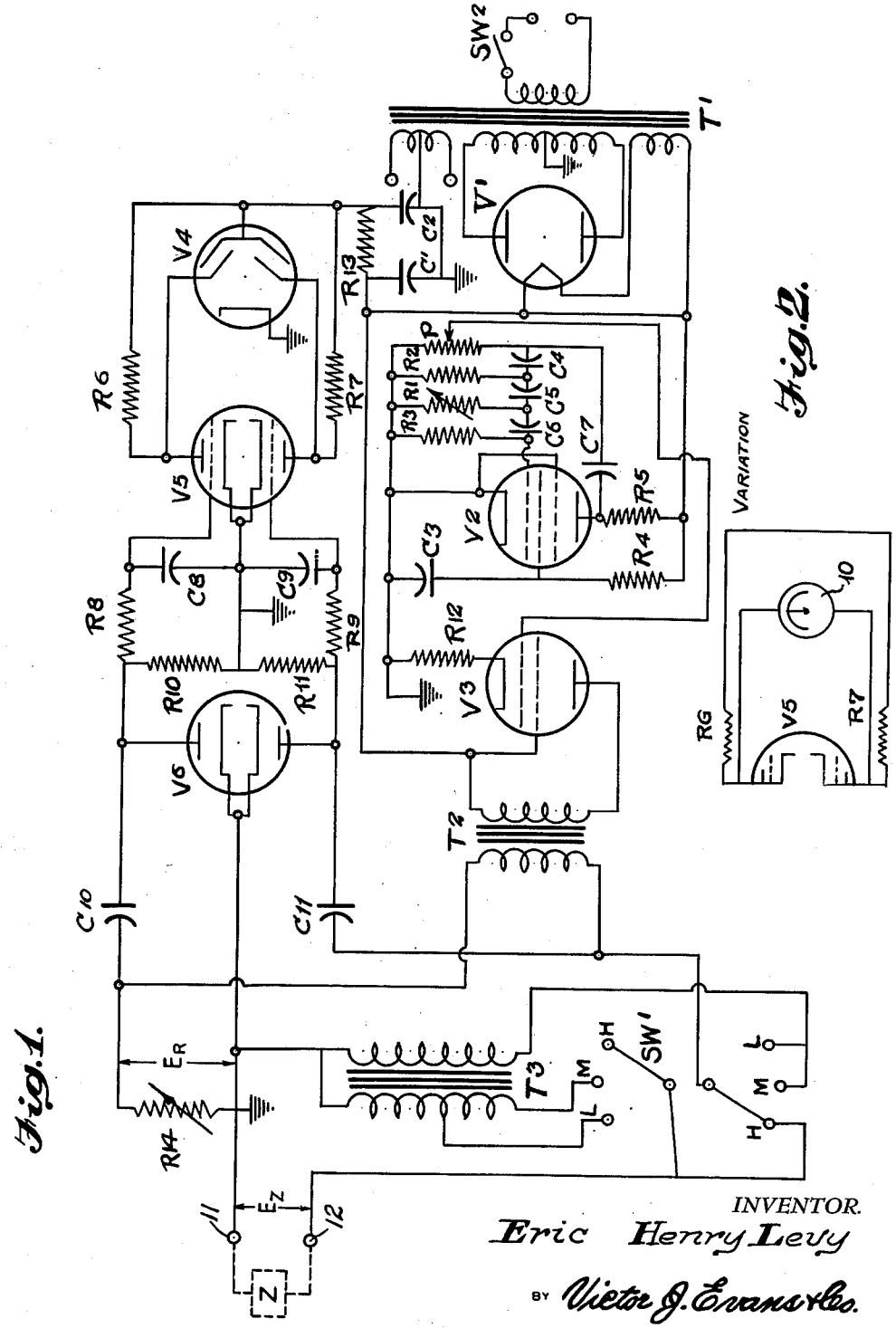

June 17, 1952     E. H. LEVY     2,600,998
ELECTRONIC IMPEDANCE METER
Filed Jan. 21, 1947

INVENTOR.
*Eric Henry Levy*
BY *Victor J. Evans & Co.*
ATTORNEYS

Patented June 17, 1952

2,600,998

UNITED STATES PATENT OFFICE 2,600,998

ELECTRONIC IMPEDANCE METER

Eric Henry Levy, Baltimore, Md.

Application January 21, 1947, Serial No. 723,271

1 Claim. (Cl. 175—183)

This invention appertains to improvements in impedance meters generally, and has for an object to provide an electronic type thereof for use in comparing two voltages as they are being rectified, the comparison being accomplished by applying the two voltages either to a twin electron-ray tube, or to a milliammeter or a voltmeter, preferably of the center zero type; a balance of the two voltages being obtained when R equals Z, regardless of phase relationship; the balance being indicated when a hairline shadow is observed at the tube, or by a zero reading at the meter.

Generally, the invention is comprised in an indicator circuit inter-connected with a phase shift audio oscillator circuit, a buffer power output circuit, and an impedance matching transformer. The indicator circuit is made up of three dual section tubes, with one section of each being used in connection with $E_R$ and the other with $E_Z$; the two voltages $E_R$ and $E_Z$ being compared as they are being rectified and then applied to the indicator, which may take the form either of an electron-ray tube, or a D. C. milliammeter or voltmeter; the balance of the two voltages being obtained when R equals Z, regardless of phase relationship. The phase shift audio oscillator is employed to feed the buffer power output stage to supply a 400 C. P. S., audio voltage of the necessary value and this voltage also may be used for general audio amplifier work. The impedance matching transformer is provided to obtain low, intermediate, and high, impedance measuring ranges. A variable resistor forms a part of the phase shift network for frequency adjustment of the oscillator, thus allowing the use of high tolerance components throughout the oscillator circuit. A potentiometer is provided for volume control, also a part of the phase shift network, and controls the input signal on the power output stage, which control allows adjustment of the measuring voltage to achieve a hairline shadow for balance on the sections of the indicator tube. If a milliammeter or a voltmeter is to be employed as the balance indicator, it will be substituted in the indicator circuit for the indicator tube and zero current through the same indicates balance of the two voltages; plate load resistors of equal values being provided to match the meter used.

In the drawings:

Figure 1 is a diagram illustrating the circuit arrangement in which the electron-ray tube is employed to indicate the balanced, or unbalanced, state of the two rectified voltages; and, Figure 2 is a diagram illustrating a part only of the circuit arrangement of Figure 1, and shows its modification to permit of the substitution of the center zero meter for the electron-ray tube.

Referring to Figure 1 of the drawings, it is to be seen that I have provided a comparatively simple impedance metering circuit involving readily obtainable parts and is comprised in an indicator circuit made up of three tubes $V^4$, $V^5$, and $V^6$, of the dual section type, the tube $V^6$ being a shunt type diode rectifier having one of its sections connected in a manner to cause the development of a voltage, designated $E_R$, across a resistance $R^{10}$ and its other section, a second voltage, designated $E_Z$, across a resistance $R^{11}$, the voltages being fed through filters $R^8$, $C^8$, and $R^9$, $C^9$, respectively, to the grids of the tube $V^5$, which is used to operate the dual indicator tube $V^4$, the latter being a type 6AF6 tube. When the input voltages $E_R$ and $E_Z$ are equal, both sections of the indicator tube will show equal deflection. A rheostat $R^{14}$ is connected to the $E_R$ section of the tube $V^6$, through a condenser $C^{10}$, to vary the applied voltage.

The indicator circuit, as thus constituted, is interconnected with an audio oscillator $V^2$ of the phase shift type and its associated circuit and this feeds a buffer power output stage, consisting of the tube $V^3$ and its coupling elements, which supplies a 400 C. P. S., audio voltage of the necessary value and this may also be used for general audio amplifier work. A resistor $R^1$, in the phase shift network, is variable for frequency adjustment of the oscillator $V^2$, while a potentiometer P is provided to control the input signal on the power output stage, which control allows adjustment of the measuring voltage to achieve hair-line shadow indication for the balance on both sections of the indicator tube $V^4$. An impedance matching transformer $T^3$ is employed to obtain additional ranges, which are to be selected by a switch $SW^1$, the contact L of which is tapped in at the required point between the ends of the transformer secondary to give a desired low impedance range of 0 to 50 ohms, while the contact M gives an intermediate impedance range of 0 to 2000 ohms and the contact H, without transformer connection, the high impedance range, to measure values up to the maximum value of the rheostat $R^{14}$.

Assuming range switch $SW^1$ to be in the "high" position designated H, the calibrated resistor $R^{14}$ is adjusted to obtain a balance indication on indicator tube $V^4$ which is preferably a shadow of hairline width. With shadows of greater width, the balance indication may not be recognizable with sufficient accuracy. The resistor $R^{14}$ may be calibrated in known manner, as by connecting a standard resistor (not shown) to measuring terminals 11 and 12. Such calibration will take care of small variations in magniture of capacitors $C^{10}$ and $C^{11}$, resistors $R^6$ to $R^{11}$, and differences between the characteristics of similar sections of dual vacuum tubes $V^4$ to $V^6$. The calibration may be repeated with switch $SW^1$ in various positions.

The unknown impedance, whose absolute magnitude is to be measured, is connected across terminals 11 and 12, and is indicated in dotted lines as Z. By tracing the circuit of Fig. 1, it will be seen that the unknown impedance A is connected in series with the unknown impedance Z and the voltage drops are individually applied to the two sections of rectifier $V^6$, the rectified voltages being separately filtered by the two filters, one filter comprising $R^{10}$, $R^8$ and $C^8$ and the other filter comprising $R^{11}$, $R^9$ and $C^9$. The voltages, after filtering are separately applied to the individual control grids of twin triode $V^5$ the two anodes thereof being separately and symmetrically connected to a source of anode supply voltage indicated as being derived from a conventional full wave rectifier energized by a power transformer $T^1$. The primary of power transformer $T^1$ is energized from a suitable source of alternating current (not shown) through a power supply switch $SW^2$. The potentials across the anodes of twin triode $V^5$ are separately and symmetrically applied to similar control electrodes of electron ray indicator tube $V^4$. When these potentials produce equal deflections of the ray image, they are considered to be equal.

By adjusting the magnitude of the testing potential as by potentiometer P, these deflections may be simultaneously adjusted in magnitude. By adjusting calibrated resistor $R^{14}$, they may be caused to become equal in magnitude.

The range switch $SW^1$ connects transformer $T^3$ so that it is interposed between the measuring portion of the circuit and terminals 11 and 12 to which the unknown impedance Z is to be connected. The apparent impedance as measured on calibrated resistor $R^{14}$ is therefore to be multiplied by the impedance ratio of transformer $T^3$ in order to ascertain its actual value. Different impedance ratios may be selected by different positions of switch $SW^1$.

In Figure 2, showing only the circuit connections from the plates of the tube $V^5$ to a D. C. meter, substituted for the electron-ray or indicator tube $V^4$. As before stated, this meter 10 may be either a milliammeter or a voltmeter and preferably of a center zero type in order that a balancing of the two voltages $E_R$ and $E_Z$ will be indicated when a zero reading is observed. Contra, the degree of unbalance of the two voltages is indicated by needle deflection from zero. Load resistors $R^6$ and $R^7$ are connected in on the plate circuits of the tube $V^5$ and are of equal value to match the meter used.

While in the foregoing I have described my invention in its preferred embodiments, it is to be understood that the words which I have used are words of description rather than of limitation, and that changes within the purview of the appended claim may be made without departing from the true scope and spirit of my invention in its broader aspects.

What I claim is:

A measuring device for determining the absolute value of an impedance comprising a source of testing voltage, a pair of terminals adapted for connection to the impedance to be measured, a calibrated adjustable resistor, circuit means connecting the resistor and the terminals in series with each other and to the source, a shunt type diode rectifier operatively connected to the terminals, a further dual section rectifier connected to the resistor, indicating means in the form of a twin electron-ray tube for comparing the absolute magnitudes of the rectified voltages appearing acorss the terminals and the resistor with each of the plates of the dual section rectifier tube being in connection with a complemental of the control electrodes of said electron-ray tube, a dual section control tube positioned between said dual section rectifier tube and said indicating means, with each of the plates of the dual section rectifier tube being connected with a complemental of the grids of said control tube with the plates of the control tube connected each with a complemental of the control electrodes of said indicating means, and similar individual filter means separately connected intermediate each of the two rectifiers and the comparing means.

ERIC HENRY LEVY.

REFERENCES CITED

The following references are of record in the file of this patent:

UNITED STATES PATENTS

| Number | Name | Date |
| --- | --- | --- |
| 2,318,140 | Clark | May 4, 1943 |
| 2,371,636 | McConnell | Mar. 20, 1945 |

OTHER REFERENCES

Electronics, May 1943, pages 86 and 87.
Radio News, January 1944, pages 28, 29 and 30.
Wireless World, June 1944, pages 162, 163 and 164.
Sales Bulletin, Z-Angle Meter, Type 310-A; Technology Instrument Corp., Waltham, Mass.